E. P. DORE AND J. A. KOHN.
CLOTHESLINE.
APPLICATION FILED OCT. 25, 1921.
1,424,626.
Patented Aug. 1, 1922.
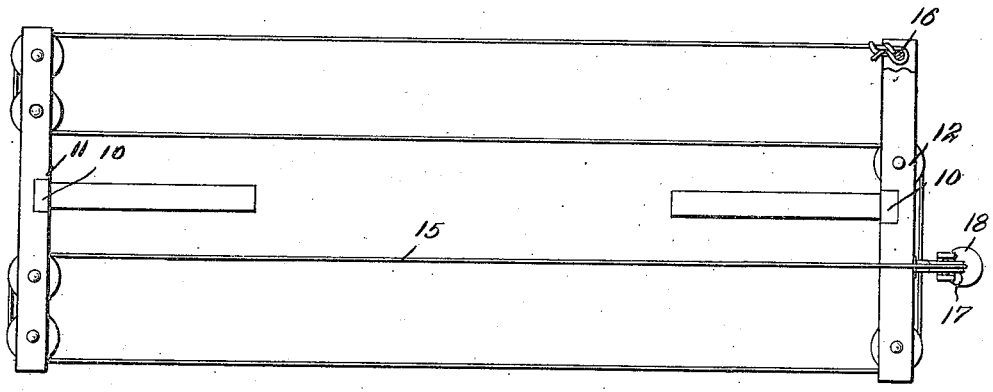
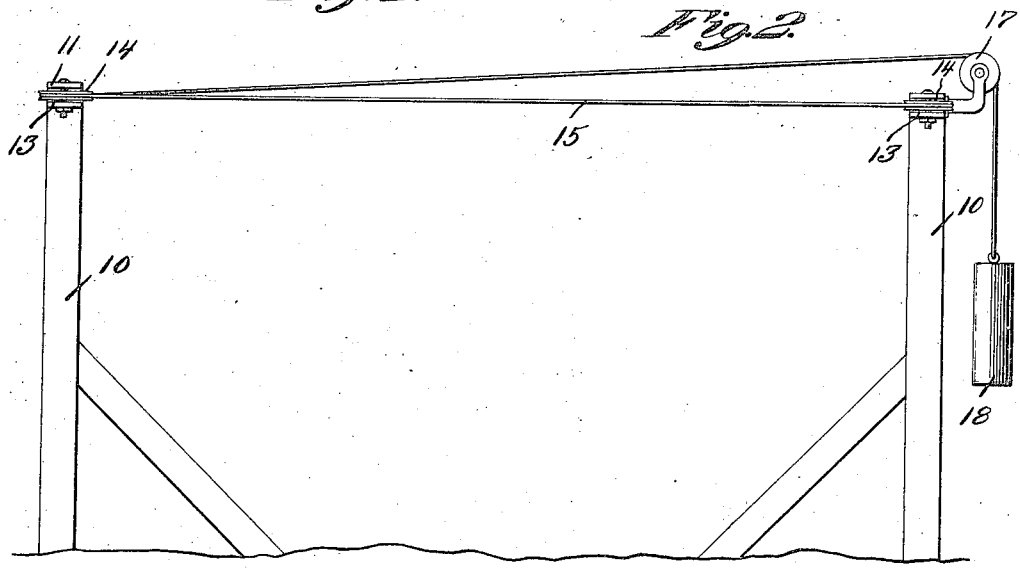
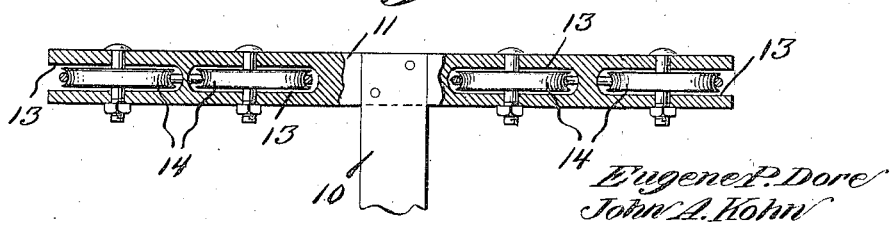
Eugene P. Dore
John A. Kohn
INVENTORS
BY Victor J. Evans
ATTORNEY
WITNESS:

UNITED STATES PATENT OFFICE.

EUGENE P. DORE AND JOHN A. KOHN, OF NORTH FOND DU LAC, WISCONSIN.

CLOTHESLINE.

1,424,626.      Specification of Letters Patent.      Patented Aug. 1, 1922.

Application filed October 25, 1921. Serial No. 510,205.

*To all whom it may concern:*

Be it known that we, EUGENE P. DORE and JOHN A. KOHN, citizens of the United States, residing at North Fond du Lac, in the county of Fond du Lac and State of Wisconsin, have invented new and useful Improvements in Clotheslines, of which the following is a specification.

This invention relates to clothes lines and more particularly to means for taking up slack in such lines, the primary object being to provide means for preventing the lines from sagging without the usual objectionable clothes props, which are liable to soil or tear the articles upon the lines.

Another object is the provision of means whereby the lines will be supported in taut condition and yet relieved of undue strain, so that liability of breaking is reduced to a minimum.

With the above and other objects in view, the invention further includes the following novel features and details of construction, to be hereinafter more fully described, illustrated in the accompanying drawings and pointed out in the appended claim.

In the drawings:—

Figure 1 is a plan view showing a clothes line supported in accordance with the present invention.

Figure 2 is a side elevation of Figure 1.

Figure 3 is a detail longitudinal section taken longitudinally through one of the supporting arms.

Referring to the drawings in detail, wherein like characters of reference denote corresponding parts, the reference character 10 indicates a post or similar object which may be anchored or supported in any desired manner. Secured to the upper end of this post is a cross arm 11, a similar arm 12 being supported in like manner, but spaced from the first mentioned arm. The arms 11 and 12 are provided with slots 13 for the accommodation of pulleys 14, the said slots forming a housing for the pulleys and likewise a guide for a line 15, so that the latter when pulled taut will be guided within the grooves of the pulleys. Any number of pulleys may be provided, depending upon the number of lines desired, the drawing showing four pulleys mounted within the arm 11 and three pulleys mounted within the arm 12 so as to provide four substantially parallel lines.

The line 15 is secured to an eye or staple 16, which is shown as secured to the arm 14 and this line is then passed around the pulleys in the manner shown, the free end of the line passing over a vertically disposed pulley 17 carried by the arm 12. Secured to the end of the line 15 is a weight 18 which acts to yieldingly maintain the line in taut condition. The size of this weight may be regulated in accordance with the length of the line, or the use for which the line is intended and will keep the line in taut condition so as to properly support the clothes without the use of props and will further reduce the liability of the line breaking.

The invention is susceptible of various changes in its form, proportions and minor details of construction and the right is herein reserved to make such changes as properly fall within the scope of the appended claim.

Having described the invention what is claimed is:

In a clothes line, spaced horizontally arranged supporting arms, pulleys rotatably mounted within openings provided in the arms, said openings providing a combined housing and guide, a line having one end secured to one of the supporting arms and passing around said pulleys and a weight secured to the opposite end of the line.

In testimony whereof we affix our signatures.

EUGENE P. DORE.
JOHN A. KOHN.